Figure 1:
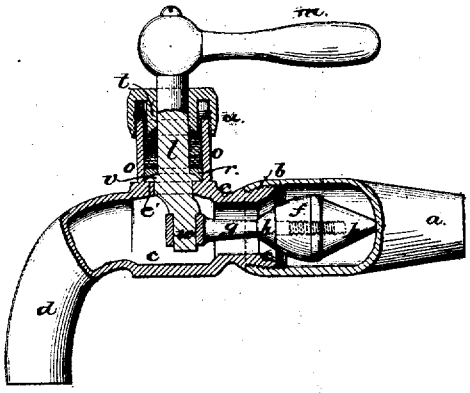

A. FULLER.

FAUCET.

No. 7,619. Reissued April 17, 1877.

Witnesses:

Geo. H. Graham.

Jacob Fillel

Inventor:

Albert Fuller by J. N. McGuire

Attorney.

UNITED STATES PATENT OFFICE

ALBERT FULLER, OF BROOKLYN, NEW YORK.

IMPROVEMENT IN FAUCETS.

Specification forming part of Letters Patent No. 167,092, dated August 24, 1875; reissue No. 7,619, dated April 17, 1877; application filed March 17, 1877.

*To all whom it may concern:*

Be it known that I, ALBERT FULLER, of Brooklyn, in the county of Kings and State of New York, have invented certain new and useful Improvements in Faucets, of which the following is a full, clear, and exact description, reference being had to the accompanying drawings, forming part of this specification.

The invention made the subject of this application relates to certain improvements upon the faucet for which Letters Patent of the United States No. 13,677 were granted to me on the 16th of October, 1855, and subsequently reissued and extended for seven years beyond the term of the original grant.

In the faucet shown in and made the subject of that patent the valve is opened against and closed with the pressure of the supply-column, and is operated by means of an eccentric pin on the spindle of the faucet, coupled or connected to one end of the valve-stem, the said spindle passing upward (to the handle of the faucet) through an ordinary stuffing-box, provided with a gland screwed into the stuffing-box to form a water-tight joint about the said spindle. In practice, two difficulties have been encountered in the use of the faucet constructed according to my said patent, viz: first, the liability of a too sudden enforcement of the valve onto its seat where there happens to be a very great head or pressure to the supply-column of water, and the consequent strain, concussion, and noise occasioned and known as a "water-hammer;" second, the liability of the packing around the spindle getting out of order, and clogged with the internal screw-thread of the gland and stuffing-box, and the difficulty, in consequence of the turning movement and lateral strain of the spindle on the stuffing-box, of keeping the joint about the spindle tight.

My present invention has for its objects to overcome these difficulties or objections found to exist in my said patented faucet; and to this end and object consists, first, in making the nut or rear part of the valve tapering, as will be hereinafter fully explained, so that the current of outflowing water will be gradually dispersed into an annular column in its passage by the valve, whereby not only will the pressure be so dispensed as to prevent any water-hammer or concussion, but the valve also be centered, or carried centrally to its seat, by the outflowing current; secondly, in the combination, with the stuffing-box formed or provided with an external thread, of a gland formed or provided with a surrounding tubular portion having an internal thread, and adapted to screw onto the open end of the stuffing-box, as will be hereinafter more fully explained, whereby not only is the possibility of any derangement of the packing or clogging of it in the screw-thread of the gland and stuffing-box prevented, but the whole contrivance rendered better capable of the desired operation, since instead of the springing or expansion of the mouth of the stuffing-box, by the wedging down of the packing, tending to loosen the screw-joint between the gland and stuffing-box, as in the patented faucet referred to, this expansion tends to make the screw-joint tighter, and thus prevent any loosening of the gland by the combined rotatory movement and lateral strain of the spindle which passes through it.

To enable those skilled in the art to make and use my invention, I will proceed to more fully describe the construction and operation of my improved faucet, referring by letters to the accompanying drawings, in which—

Figure 2:
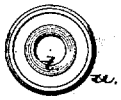
Figure 3:
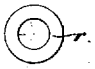

Figure 1 is a sectional elevation of a faucet embracing the several improvements constituting my present invention. Fig. 2 is a bottom view of the novel gland used, and Fig. 3 is a detailed view of the gasket used in the stuffing-box.

C is the body of the cock, which is formed, as usual, with a bit or discharge-nozzle, *d*, and a gland-chamber or stuffing-box, *o*, and is provided with an inlet-tube, *a*, connected by a screw-joint at *b*, all as clearly illustrated.

Within the body *c*, and near its junction with the tube *a*, is formed the seat *e* for the valve *f*.

This valve *f* is elastic, being made, preferably, of rubber, and it is mounted on the valve-stem *g* so as to come against the metallic valve base or shoulder *k* of said stem, as shown, where it is securely held in place by a conical nut, *h*, screwed onto the teat of the stem *g*, (see dotted lines, Fig. 1,) between which nut and the metal valve-base *e* the said elastic valve *f* is clamped.

The forward end of the valve-stem *g* is coupled by an eye to an eccentric pin or crank-pin, *w*, on the lower end of the spindle or arbor *l*, the upper end of which is provided with the usual handle *m*, and the said spindle *l* passes upward through the stuffing-box *o*. The spindle *l* is formed or provided with a collar or shoulder at *v*, which bears on the shoulder or seat *e'* at the bottom of the stuffing-box *o*, and a lead gasket, *r*, is placed round the spindle and over its collar or shoulder *v*, to serve as a support for the elastic packing or stuffing material *s*, in such manner that the latter may not be forced down under the collar *v*, and so that the spindle will be properly held down in place.

The gland and cap are formed, it will be seen, with two tubular or cylindrical portions, *u* and *t*, the former, *u*, fitting over and onto the upper end of the stuffing-box *o*, and being provided with an internal screw-thread, that engages with an external thread on the stuffing-box *o*, while the latter, *t*, is adapted to enter into the said stuffing-box, (has no thread on it,) and operate in the usual manner when forced down to crowd down or compress the packing material *s*.

The general operation of my improved valve is, of course, about the same as the one previously patented to me, as referred to—that is to say, by turning the handle *m* into the position seen at Fig. 1, the rotation of the spindle *l*, with its eccentric pin *w*, will force the valve-stem and valve backward into the supply-pipe *a*, against the pressure of the water, and permit the latter to make its exit past the valve *f*, (between it and its seat *e*,) through the body *c*, and thence out at the bib or nozzle *d*, while to stop the discharge the handle *m* is turned as usual, so as to bring the elastic valve *f* back again to its seat *e*, and thus cut off the supply of water from the cock.

But, in practice, the operations or working of the faucet shown and described differ from previously-known faucets in these two important particulars, viz:

First, when the valve is forced back, as seen at Fig. 1, to permit the discharge, the nut or rear portion *k* of the valve, that extends back into the supply-pipe *a*, being made conical or tapered back from the maximum diameter of the valve to a point, the valve is not only centered in the outwardly-rushing column or current of water, that is split by and passes round said valve, so as to insure, in cases of great pressure, an easy and central seating of the valve as it passes suddenly to its seat, but it is also prevented from producing any ram or "water-hammer" in cases where the pressure is great, and the closing of the valve suddenly effected.

Second, by reason of the described construction of the gland-cap *t n*, and its arrangement with the stuffing-box formed with an external thread, not only is all clogging of the elastic packing material with the screw-threads of the gland and stuffing-box avoided, but the maintenance of a perfectly-tight joint around the spindle is insured, and the liability of derangement of the working parts by the constant turning and lateral strain of the spindle within the gland wholly avoided, because the forcing in of the gland *t* to compress the packing tends rather, by expanding the mouth of the stuffing-box *o*, to make the screw-joint between the box *o* and cap *u* tighter, and thus render any turning round of the gland (by the turning and strain of spindle *l*) impossible.

Having so fully explained the construction and operation of my improved faucet that any skilled person can make and use it, and having clearly pointed out wherein said faucet differs in construction and operation from faucets made and used before, what I claim as of my invention, and desire to secure by Letters Patent, is—

1. A faucet in which the valve opens against and closes with the pressure, having the nut or rear part of the valve made conical or tapering, substantially as shown and specified, for the purposes set forth.

2. In a faucet having a stuffing-box for the accommodation of the spindle, passing from the handle to the interior of the body, the combination, with the box containing the stuffing, and threaded on its exterior, of a gland and cap composed of two cylindrical portions, *t* and *n*, the combination being and operating as and for the purposes set forth.

In testimony whereof I have hereunto set my hand and seal this 7th day of March, 1877.

ALBERT FULLER. [L. S.]

In presence of—
J. N. McINTIRE,
JACOB FELBEL.